United States Patent
Corsmeier et al.

(10) Patent No.: US 10,533,747 B2
(45) Date of Patent: Jan. 14, 2020

(54) ADDITIVELY MANUFACTURED MECHANICAL FASTENER WITH COOLING FLUID PASSAGEWAYS

(71) Applicant: General Electric Company, Schenectady, NY (US)

(72) Inventors: Donald Michael Corsmeier, West Chester, OH (US); Peter Andrew Flynn, Delmar, NY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 15/474,004

(22) Filed: Mar. 30, 2017

(65) Prior Publication Data

US 2018/0283691 A1 Oct. 4, 2018

(51) Int. Cl.
F16B 35/04 (2006.01)
F23R 3/04 (2006.01)
F23R 3/60 (2006.01)
F02C 7/18 (2006.01)
F16B 39/06 (2006.01)

(52) U.S. Cl.
CPC ............ *F23R 3/04* (2013.01); *F02C 7/18* (2013.01); *F16B 39/06* (2013.01); *F23R 3/60* (2013.01); *F05D 2220/32* (2013.01); *F05D 2230/22* (2013.01); *F05D 2230/234* (2013.01); *F05D 2230/30* (2013.01); *F05D 2240/35* (2013.01); *F05D 2260/201* (2013.01)

(58) Field of Classification Search
CPC .......... F16B 35/04; F16B 35/06; F16B 39/06; F22B 7/16
USPC .................................. 411/381–382, 395, 403
See application file for complete search history.

(56) References Cited

U.S. PATENT DOCUMENTS

| | | | | | |
|---|---|---|---|---|---|
| 1,022,121 | A | * | 4/1912 | Boyland | F16B 2/18 174/204 |
| 1,159,779 | A | * | 11/1915 | Landau et al. | B60G 11/12 267/268 |
| 1,275,892 | A | * | 8/1918 | Flannery et al. | F22B 7/16 411/381 |
| 3,407,903 | A | * | 10/1968 | Sansabrino | F16B 33/00 16/274 |
| 3,457,573 | A | * | 7/1969 | Payne | B21K 1/44 411/395 |
| 3,520,222 | A | * | 7/1970 | Placek | F16B 21/186 411/353 |
| 3,886,707 | A | * | 6/1975 | Heldt | F16B 31/04 403/31 |

(Continued)

OTHER PUBLICATIONS

Copy of PCT International Search Report Corresponding to Application PCT/US2017/067468 dated Apr. 16, 2018.

*Primary Examiner* — Roberta S Delisle
(74) *Attorney, Agent, or Firm* — Dority & Manning, P.A.

(57) ABSTRACT

An additively manufactured fastener and a method of manufacturing the same are provided. The fastener includes a shank defining an internal passageway and a head defining a distribution plenum in fluid communication with the internal passageway. The head further defines a cooling face defining a plurality of cooling holes for receiving a flow of cooling air from the internal passageway and the distribution plenum. In addition, an impingement baffle is positioned in the distribution plenum and defines impingement holes for directing the flow of cooling air onto the cooling face.

19 Claims, 8 Drawing Sheets

(56) References Cited

U.S. PATENT DOCUMENTS

| | | | |
|---|---|---|---|
| 4,749,298 A | 6/1988 | Bundt et al. | |
| 4,820,097 A * | 4/1989 | Maeda | F02K 1/80 |
| | | | 165/134.1 |
| 5,072,785 A * | 12/1991 | Dressler | F01D 25/243 |
| | | | 165/134.1 |
| 5,129,447 A * | 7/1992 | Hamner | F02K 1/80 |
| | | | 165/134.1 |
| 5,332,271 A | 7/1994 | Grant et al. | |
| 6,902,366 B2 * | 6/2005 | Ducker, III | F16B 33/004 |
| | | | 411/258 |
| 6,941,758 B2 * | 9/2005 | Tiemann | F16B 33/00 |
| | | | 411/395 |
| 9,175,710 B2 | 11/2015 | Schrameyer et al. | |
| 9,341,372 B2 * | 5/2016 | Penz | F23R 3/007 |
| 2004/0093872 A1 | 5/2004 | Tiemann | |
| 2004/0109738 A1 * | 6/2004 | Ducker, III | F16B 33/004 |
| | | | 411/82.1 |
| 2014/0234052 A1 | 8/2014 | Blom | |
| 2015/0260400 A1 | 9/2015 | Clemen | |
| 2016/0169261 A1 | 6/2016 | Peters et al. | |
| 2016/0215811 A1 | 7/2016 | Twelves, Jr. et al. | |
| 2016/0273369 A1 | 9/2016 | McBrien et al. | |
| 2016/0273770 A1 | 9/2016 | Hanson et al. | |
| 2016/0313005 A1 | 10/2016 | Chang et al. | |
| 2016/0377296 A1 | 12/2016 | Bangerter et al. | |

\* cited by examiner

ADDITIVELY MANUFACTURED MECHANICAL FASTENER WITH COOLING FLUID PASSAGEWAYS

FEDERAL RESEARCH STATEMENT

This invention was made with Government support under Contract No. FA8650-09-D-2922, awarded by the U.S. Department of Defense. The Government has certain rights in the invention.

FIELD

The present subject matter relates generally to mechanical fasteners, and more particularly, to additively manufactured mechanical fasteners including internal fluid passageways to facilitate cooling.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Mechanical fasteners having various sizes, shapes, and configurations are used throughout conventional gas turbine engines to mechanically couple various components or sections of the engine. Frequently, such fasteners are exposed to high temperatures associated with operation of the gas turbine engine. For example, mechanical fasteners are used to connect various components within the combustion section of the gas turbine engine. Notably, these fasteners may melt, oxidize, or otherwise deteriorate if exposed to such high temperatures without sufficient cooling. In addition, when fastener heads are exposed within a film cooled surface of the gas turbine engine, the fastener heads may disrupt the film, resulting in localized hot spots.

Accordingly, a gas turbine engine with mechanical fasteners capable of withstanding high temperatures would be useful. More specifically, mechanical fasteners having integrated cooling features would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufacturing fastener defining a centerline is provided. The fastener includes a shank extending along the centerline and defining an internal fluid passageway. A head is attached to the shank and defines a distribution plenum in fluid communication with the internal fluid passageway, the head including a cooling face defining a plurality of cooling holes in fluid communication with the distribution plenum.

In another exemplary aspect of the present disclosure, a method of manufacturing a fastener is provided. The method includes depositing a layer of additive material on a bed of an additive manufacturing machine and directing energy from an energy source onto the layer of additive material to fuse a portion of the additive material and form the fastener. The fastener includes a shank defining an internal fluid passageway and a head attached to the shank and including a cooling face defining a plurality of cooling holes in fluid communication with the internal fluid passageway.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
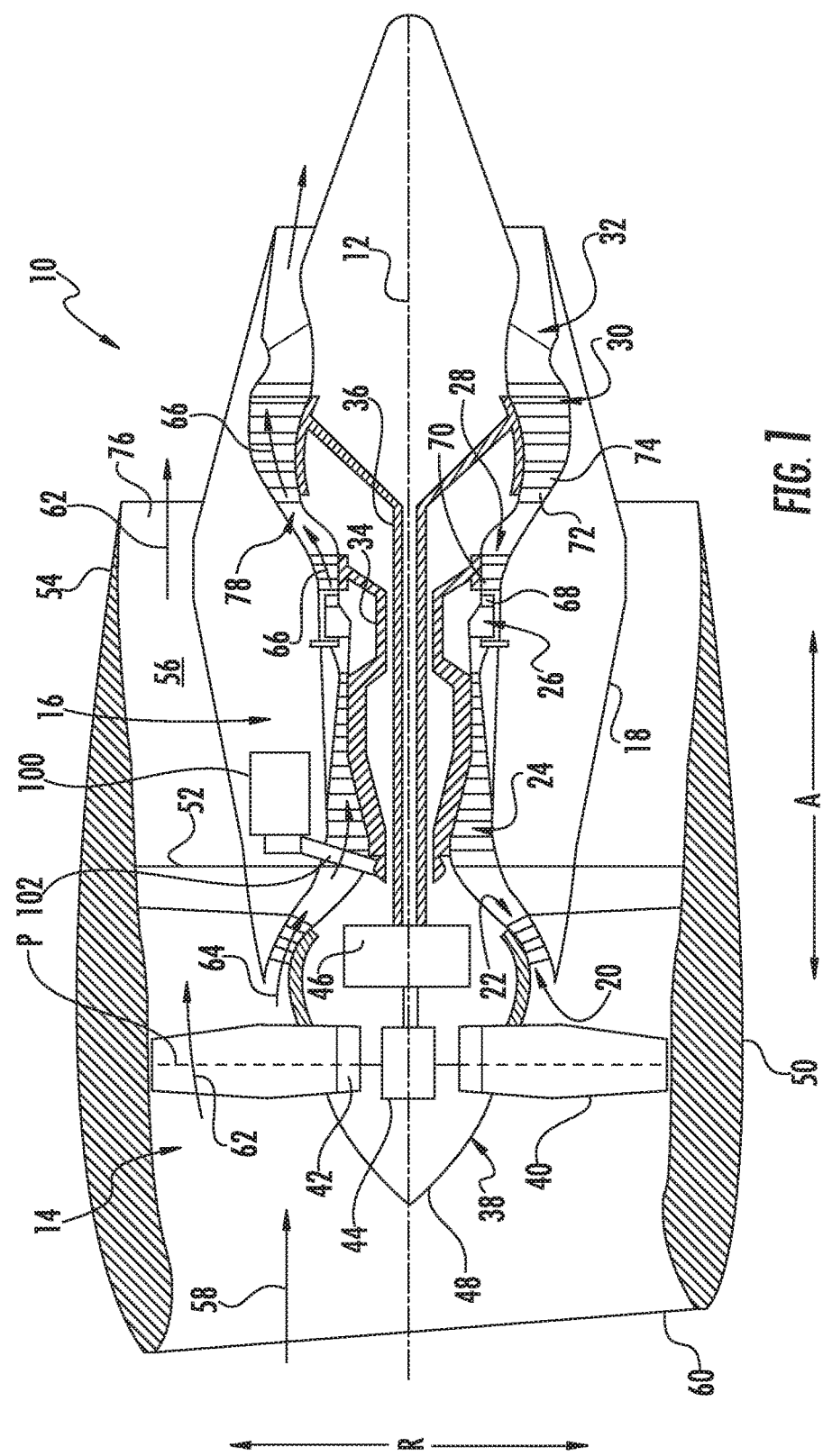
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The present disclosure is generally directed to an additively manufactured mechanical fastener and a method of manufacturing the same. The fastener includes a shank defining an internal passageway and a head defining a distribution plenum in fluid communication with the internal passageway. The head further defines a cooling face defining a plurality of cooling holes for receiving a flow of cooling air from the internal passageway and the distribution plenum. In addition, an impingement baffle is positioned in the distribution plenum and defines impingement holes for directing the flow of cooling air onto the cooling face.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Turbofan 10 may include one or more mechanical fasteners 100 at various locations throughout turbofan 10 to couple various sections, join multiple components, or otherwise attach various components of turbofan 10. Mechanical fasteners 100 are often exposed to very high temperatures if used in certain locations within turbofan 10. For example, mechanical fastener 100 may be used in combustion section 26, as described in more detail below. To prevent degradation and premature failure in such a hot environment, mechanical fastener 100 includes various features to facilitate cooling of mechanical fastener 100 and/or locations of turbofan 10 positioned proximate mechanical fastener 100. Although mechanical fastener 100 is illustrated below as being positioned within combustion section 26, it should be appreciated that this is only one exemplary application used to describe various features and functions of mechanical fastener 100. According to alternative embodiments, mechanical fastener 100 may be used in any suitable location of turbofan 10 or in any other application where two or more components need to be joined and localized cooling is desired.

In general, the exemplary embodiments of mechanical fastener 100 described herein may be manufactured or formed using any suitable process. However, in accordance with several aspects of the present subject matter, mechanical fastener 100 may be formed using an additive-manufacturing process, such as a 3-D printing process. The use of such a process may allow mechanical fastener 100 to be formed integrally, as a single monolithic component, or as any suitable number of sub-components. In particular, the manufacturing process may allow mechanical fastener 100 to be integrally formed and include a variety of features not possible when using prior manufacturing methods. For example, the additive manufacturing methods described herein enable the manufacture of mechanical fasteners having various features, configurations, thicknesses, materials, densities, and fluid passageways not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt base superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and fluid passageways having unique sizes, shapes, and orientations. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Referring now generally to FIGS. 2 through 14, various embodiments of mechanical fasteners 100 will be described according to exemplary embodiments of the present subject matter. Due to the similarity of the embodiments described, similar reference numerals will be used to refer to the same or similar parts of mechanical fastener 100 from each figure. In addition, it should be appreciated that the exemplary embodiments of mechanical fasteners 100 described herein are used only to describe aspects of the present subject matter. In this regard, for example, the shape, size, position, and orientation of the mechanical fastener and its internal passageways may vary or be modified while remaining within the scope of the present subject matter.

Figure 2:
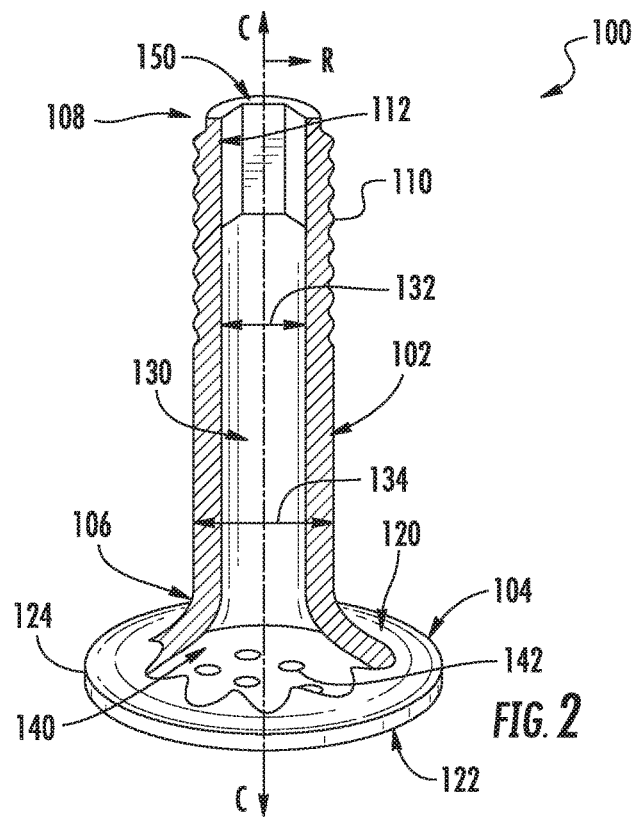
FIG. 2 provides a partial perspective view of an additively manufactured mechanical fastener according to an exemplary embodiment of the present subject matter.
Figure 3:
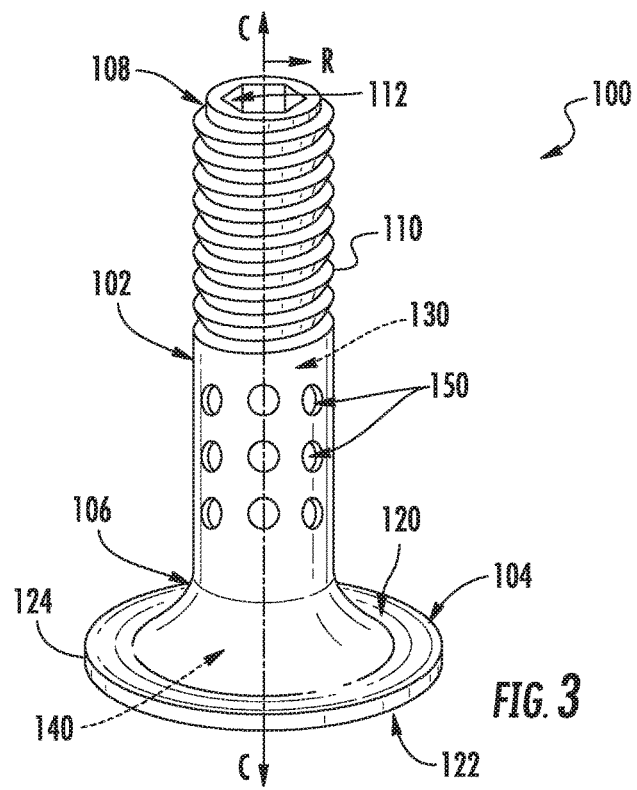
FIG. 3 provides a perspective view of an additively manufactured mechanical fastener according to another exemplary embodiment of the present subject matter.

Referring now specifically to FIG. 2, fastener 100 generally defines a centerline C and a radial direction R extending perpendicular to the centerline C. Fastener 100 comprises a shank 102 extending along the centerline C and a head 104 attached to the shank 102. More specifically, according to the illustrated embodiment, head 104 is attached to an axial end, e.g., first end 106 of shank 102. Shank 102 may further define a second end 108 positioned opposite of first end 106 along the centerline C.

According to the illustrated embodiment, a portion of shank 102 proximate second end 108 is threaded, e.g., is formed having threads 110 for engaging a nut, boss, or other feature having complementary threads. However, it should be appreciated that according to alternative embodiments, shank 102 may be a simple cylinder or may define a different fastening mechanism, such as a groove configured for receiving a retaining ring, a snap ring, a cotter pin, a swage fitting, a rivet, etc. In addition, according to an exemplary embodiment, second end 108 may be keyed for receiving a tool enabling the rotation of fastener 100. For example, as illustrated, second end 108 defines an female hex socket 112 which may receive a hex key or Allen wrench to allow for rotating fastener 100 from second end 108.

Shank 102 and head 104 may have any suitable size or shape depending on the application. For example, according to the illustrated embodiment, shank 102 and head 104 are both cylindrical about the centerline C. However, according to alternative embodiments, shank 102 and/or head 104 could instead have a substantially square cross sectional area. For example, referring briefly to FIG. 12, head 104 may have a substantially elliptical shape, e.g., for being received within a component having a corrugated surface or for otherwise enabling the alignment of fastener 100 along a particular direction. According to an alternative embodiment, head 104 may be axisymmetric, asymmetric, oblong, or irregularly shaped. In addition, second end 108 of shank 102 and/or head 104 may define any other suitable shape or defined recess to assist in rotating and or engaging a fastening surface, such as a hex head, a screw head, etc.

In addition, according to the illustrated embodiment, head 104 has a larger diameter measured along the radial direction R than shank 102, e.g., for engaging a surface for attachment. However, shank 102 and head could be substantially the same size or could have any other suitable features for engaging an attachment surface. It should be appreciated, that as used herein, terms of approximation, such as "approximately," "substantially," or "about," refer to being within a ten percent margin of error. In addition, shank 102 and head 104 may be joined at a ninety degree angle or may have a filleted joint as illustrated in the figures.

Head 104 defines a mating face 120 and a cooling face 122 separated along the centerline C and facing opposite directions. In this regard, for example, shank 102 and head 104 are joined on mating face 120, which faces substantially toward first end 106. By contrast, cooling face 122 is positioned on a distal end of head 104 relative to shank 102 such that it faces away from shank 102. In addition, head 104 may define a perimeter 124. Perimeter 124 is a radially outermost portion of head 104 that extends between mating face 120 and cooling face 122.

Referring still to FIGS. 2 through 14, fastener 100 may generally define a plurality of fluid passageways configured for receiving a flow of cooling air or another suitable fluid. The cooling fluid passageways may be integrally formed within shank 102 and head 104 of fastener 100 to direct cooling air to locations where localized hot spots are likely or where cooling is otherwise needed. The cooling fluid passageways described herein are only exemplary, and may be modifiable and interchangeable between fasteners 100 according to alternative exemplary embodiments of the present subject matter.

As illustrated, shank 102 defines an internal fluid passageway 130. According to the illustrated embodiment, internal fluid passageway 130 defines a cross sectional diameter 132 that is approximately half of a shank width 134. However, depending on the structural and cooling needs of a particular fastener 100, the size of fluid passageway 130 may be varied accordingly. In addition, internal fluid passageway 130 is illustrated as extending along the centerline C along the entire length of shank 102. However, according to alternative embodiments, internal fluid passageway 130 may extend along only a portion of shank 102, may be arcuate, may include multiple fluid passageways, or may be formed in any other suitable manner.

In addition, head 104 may define a distribution plenum 140 in fluid communication with internal fluid passageway 130. Cooling face 122 also defines a plurality of cooling holes 142 in fluid communication with the distribution plenum 140. In this regard, for example, distribution plenum 140 may be configured for receiving a flow of cooling fluid, e.g., from internal fluid passageway 130 or directly through mating face 120, and distributing the flow of cooling fluid throughout head 104 and to each of the cooling holes 142.

Cooling holes 142 may be defined in cooling face 122 in any suitable orientation for achieving the desired cooling. For example, according to one exemplary embodiment, cooling holes 142 extend through cooling face 122 substantially parallel to the centerline C, e.g., perpendicular to cooling face 122, for injecting cooling air into a space adjacent cooling face 122 (see, e.g., FIG. 8). According to alternative embodiments such as illustrated in FIGS. 7, 9, 11, and 13, cooling holes 142 extend through cooling face 122 at an angle 144 relative to the centerline C. Angle 144 may be selected to maximize the film cooling effect achieved by fastener 100. For example, according to the illustrated embodiment, angle 144 is about forty-five degrees, but could be any other suitable angle according to alternative embodiments.

Figure 4:
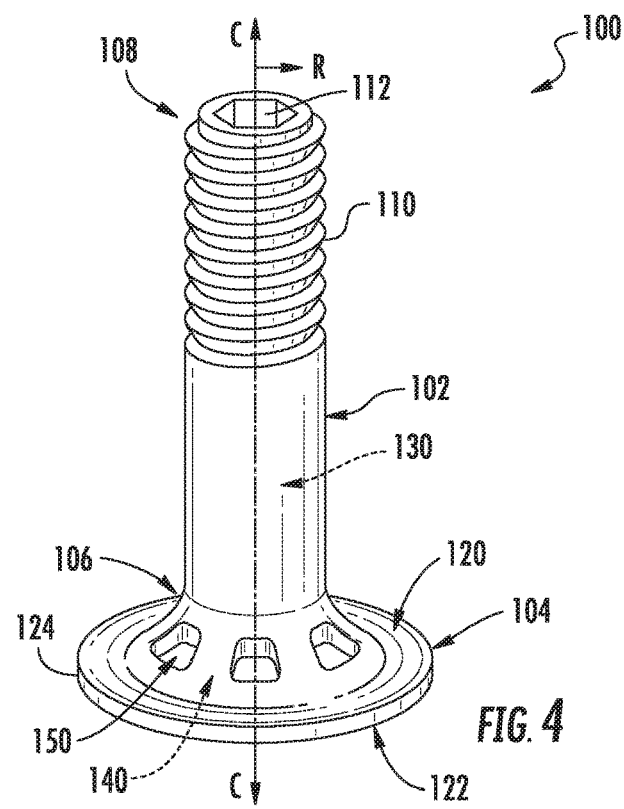
FIG. 4 provides a perspective view of an additively manufactured mechanical fastener according to another exemplary embodiment of the present subject matter.
Figure 5:
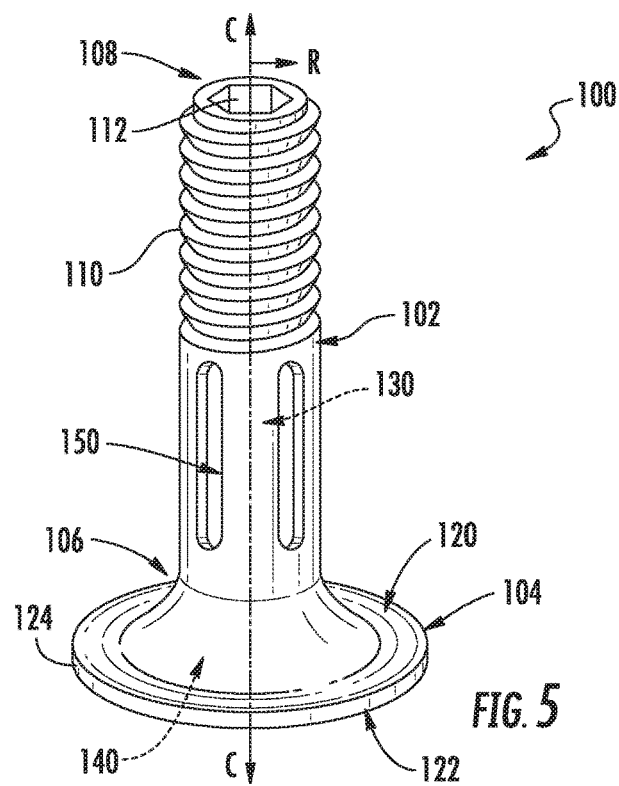
FIG. 5 provides a perspective view of an additively manufactured mechanical fastener according to another exemplary embodiment of the present subject matter.
Figure 6:
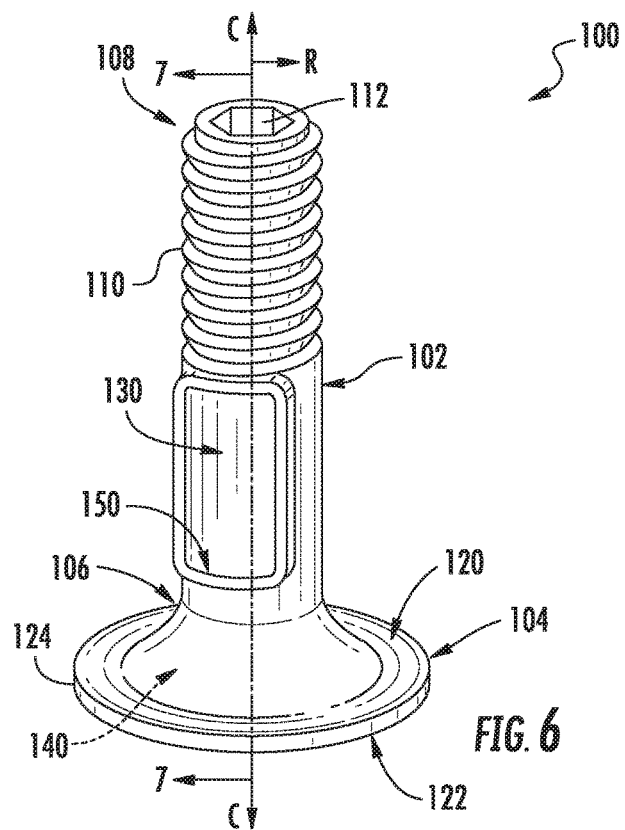
FIG. 6 provides a perspective view of an additively manufactured mechanical fastener according to another exemplary embodiment of the present subject matter.
Figure 7:
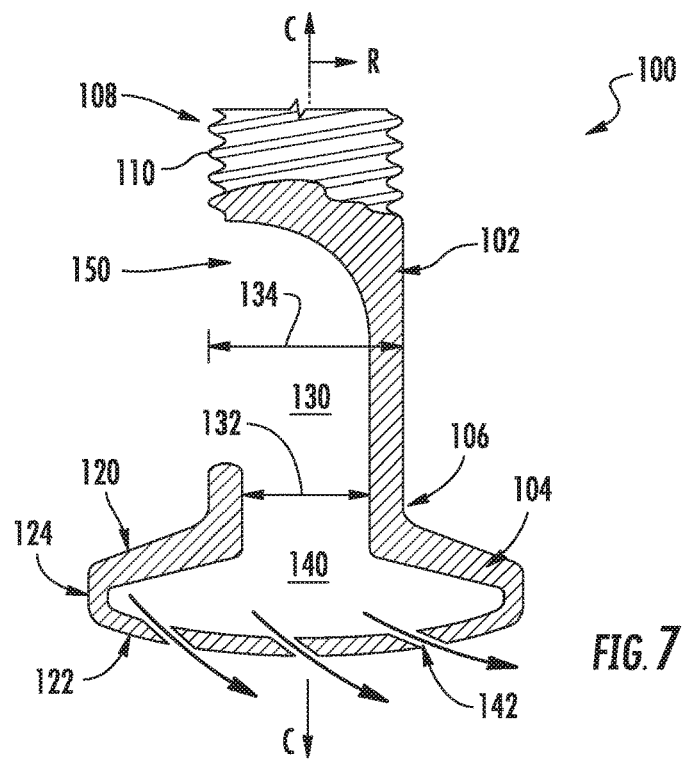
FIG. 7 provides a cross sectional view of the exemplary mechanical fastener of FIG. 6, taken along Line 7-7 of FIG. 6.
Figure 8:
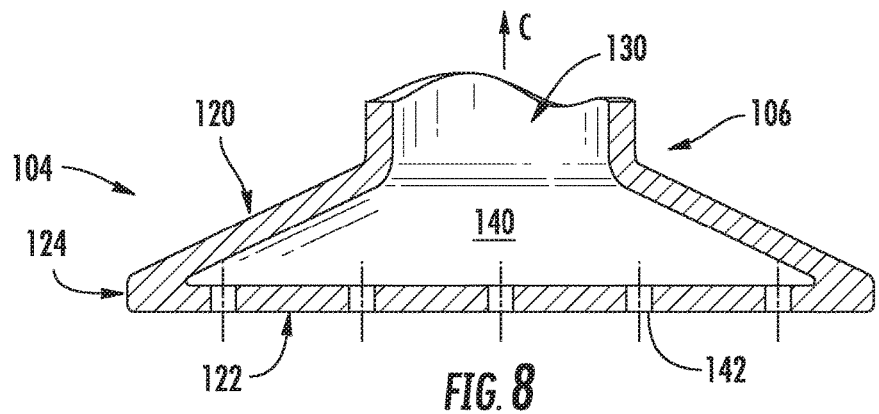
FIG. 8 provides a cross sectional view of a head of an additively manufactured mechanical fastener according to an exemplary embodiment of the present subject matter.

Fastener 100 may define one or more fluid inlets 150 at any suitable location for receiving a flow of cooling fluid. For example, as illustrated in FIG. 4, mating surface 120 of head 104 defines a plurality of circumferentially spaced fluid inlets 150. In this regard, cooling fluid flows directly from the ambient environment outside fastener 100 into distribution plenum 140. According to such an embodiment, head 104 must be large enough to allow mating surface 120 to engage the fastening surface without blocking fluid inlets 150. It should be appreciated that according to this exemplary embodiment, internal fluid passageway 130 may not be needed to achieve cooling of head 104, but may be included, e.g., to receive cooling fluid throughout fastener 100.

By contrast, shank 102 may define one or more fluid inlets 150. For example, referring to FIG. 2, first end 106 can define a fluid inlet 150 extending parallel to the centerline C, e.g., through female hex socket 112. According to FIGS. 3 and 5, shank 102 may define fluid inlets 150 in the form of a plurality of circumferentially spaced apertures or slots. According to still another embodiment illustrated in FIGS. 6 and 7, shank 102 may define fluid inlet 150 in the form of a slot and scoop positioned only at one radial location along shank 102. In this manner, fastener 100 may be rotated such that fluid inlet 150 may be positioned to face upstream within a fluid passageway, e.g., to receive higher pressure flow, or may be positioned to face downstream within the fluid passageway, e.g., to reduce the ingestion of contaminants within the fluid passageway.

Figure 9:
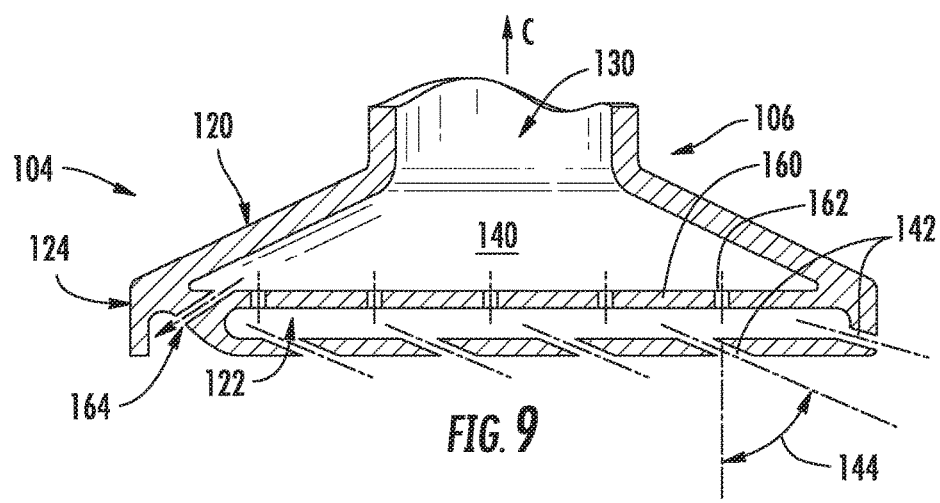
FIG. 9 provides a cross sectional view of a head of an additively manufactured mechanical fastener according to another exemplary embodiment of the present subject matter.
Figure 10:
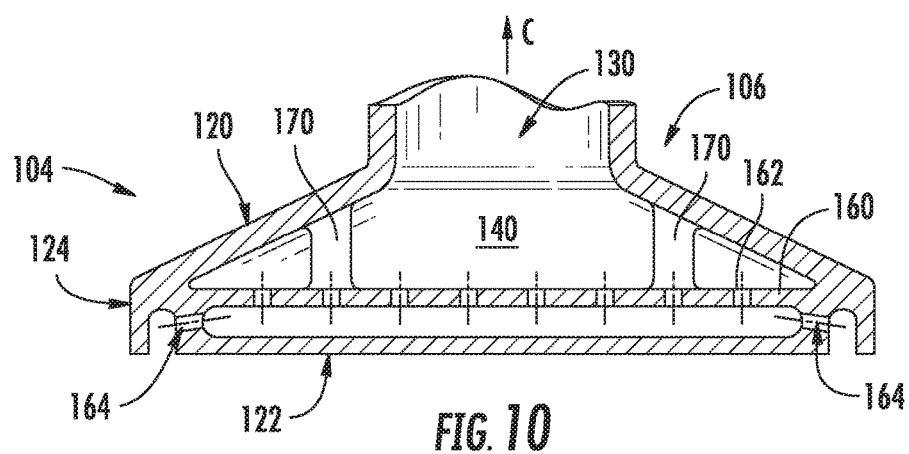
FIG. 10 provides a cross sectional view of a head of an additively manufactured mechanical fastener according to another exemplary embodiment of the present subject matter.
Figure 11:
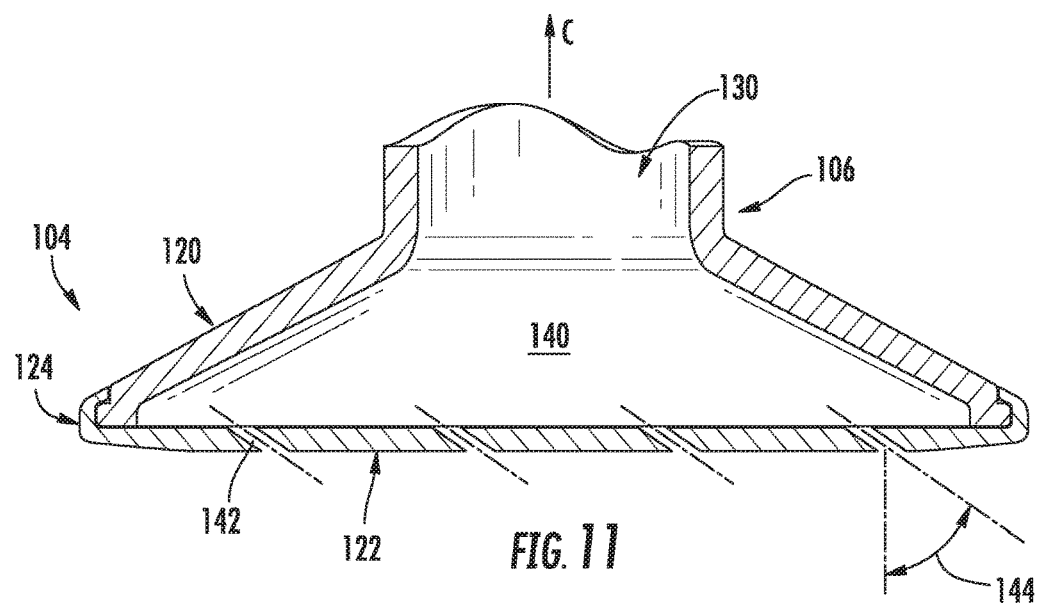
FIG. 11 provides a cross sectional view of a head of an additively manufactured mechanical fastener according to another exemplary embodiment of the present subject matter.
Figure 12:
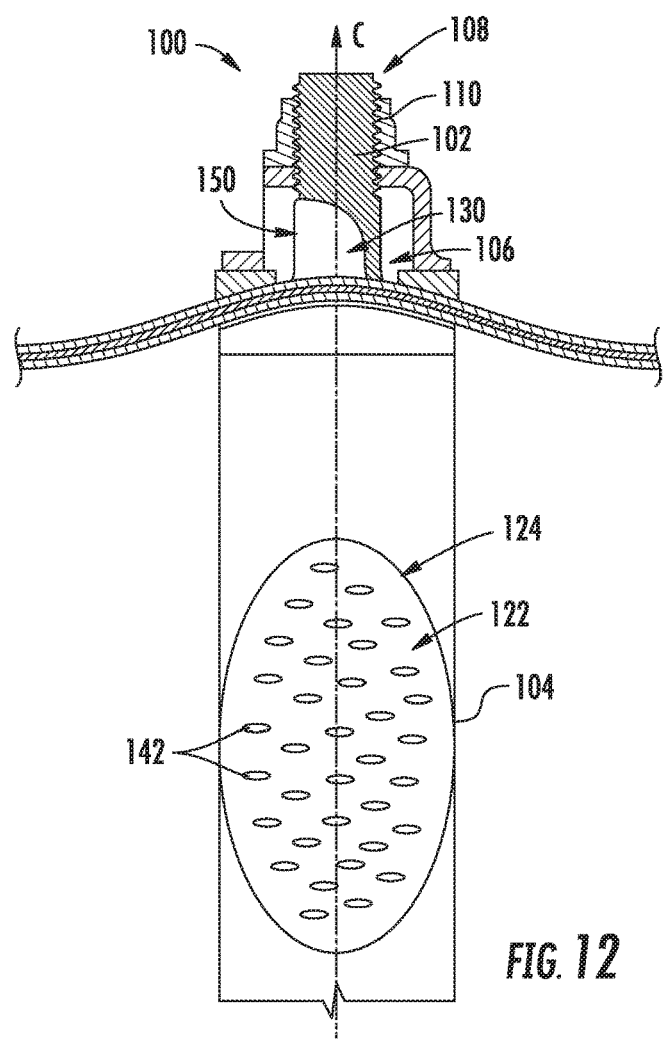
FIG. 12 provides a schematic view of an additively manufactured mechanical fastener installed in a corrugated plate according to an exemplary embodiment of the present subject matter.

Referring now to FIGS. 9 and 10, fastener 100 may further include an impingement baffle 160 for impinging the flow of cooling fluid onto cooling face 122. More specifically, impingement baffle 160 may be defined by head 104 and positioned within distribution plenum 140, e.g., spaced apart from cooling face 122 along the centerline C. Impingement baffle 160 defines a plurality of impingement holes 162 for directing a flow of cooling fluid onto cooling face 122 to facilitate cooling at desired locations. According to the illustrated embodiment, impingement baffle 160 extends substantially along the radial direction R parallel to cooling face 122 and impingement holes 162 extend substantially parallel to the centerline C. However, according to alternative embodiments, impingement baffle 160 and impingement holes 162 may be sized, positioned, and oriented in any suitable manner.

In addition, according to an exemplary embodiment of the present subject matter, head 104 and/or impingement baffle 160 may define additional fluid passageways for serving other specific purposes. For example, referring to FIGS. 9 and 10, head 104 defines at least one perimeter cooling passageway 164 that extends through impingement baffle 160 at an angle relative to the centerline C to direct a flow of cooling fluid directly onto perimeter 124.

The various portions of fastener 100 may be constructed using any suitable material, in any suitable geometry, density, and thickness, as needed to provide necessary structural support to fastener 100. In addition, fastener 100 may define one or more support structures 170 to ensure the structural rigidity of fastener 100. According to the illustrated embodiment shown in FIG. 10, support structures 170 are circumferentially spaced struts within distribution plenum 140 that extend between mating face 120 and cooling face 122 to provide structural rigidity to head 104. However, according to alternative embodiments, support structures 170 may have any suitable size, shape, and position. For example, support structures 170 may take the form of a stiffening matrix of material, internal fillets, or stiffening ridges within shank 102 or head 104.

Notably, using the manufacturing methods described herein, fastener 100 may be formed as a single integral piece or as multiple assembled pieces. In this regard, for example, referring to FIG. 11, shank 102 and a portion of head 104 may be formed as one piece and cooling face 122 may be swaged or snapped onto head 104, e.g., to simplify repair or replacement. In addition, fastener 100 may be formed from one or more materials. For example, a high strength material may be used for shank 102 and a temperature resistant material may be used for head 104. Other configurations are possible and within the scope of the present subject matter.

Figure 13:
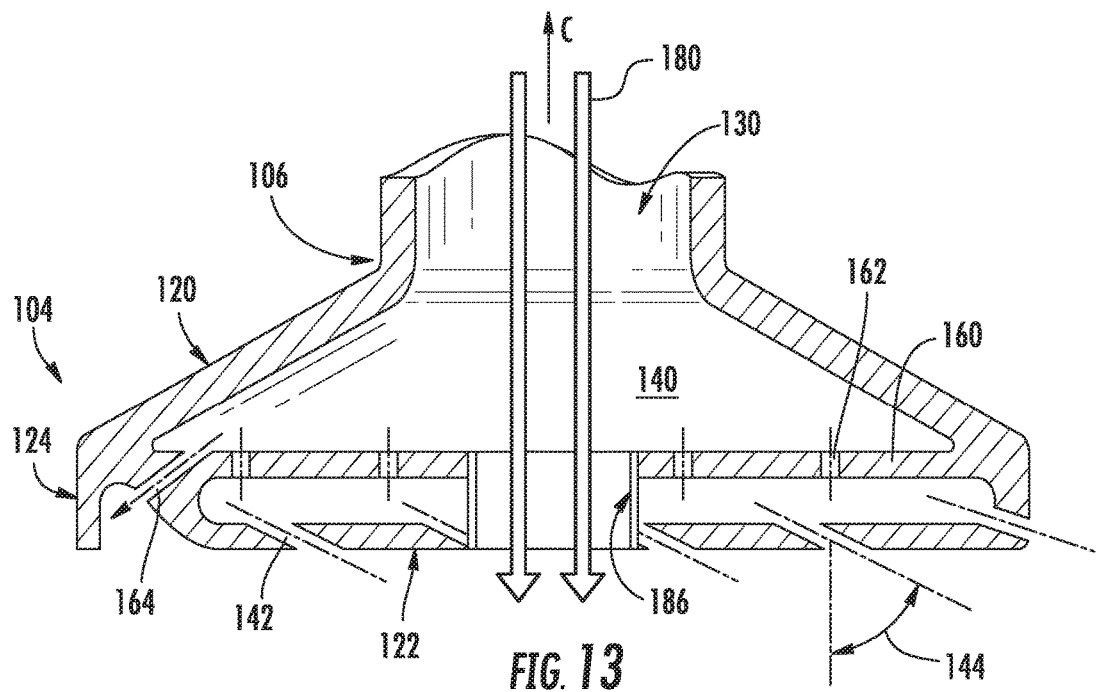
FIG. 13 provides a cross sectional view of a head of an additively manufactured mechanical fastener according to another exemplary embodiment of the present subject matter.
Figure 14:
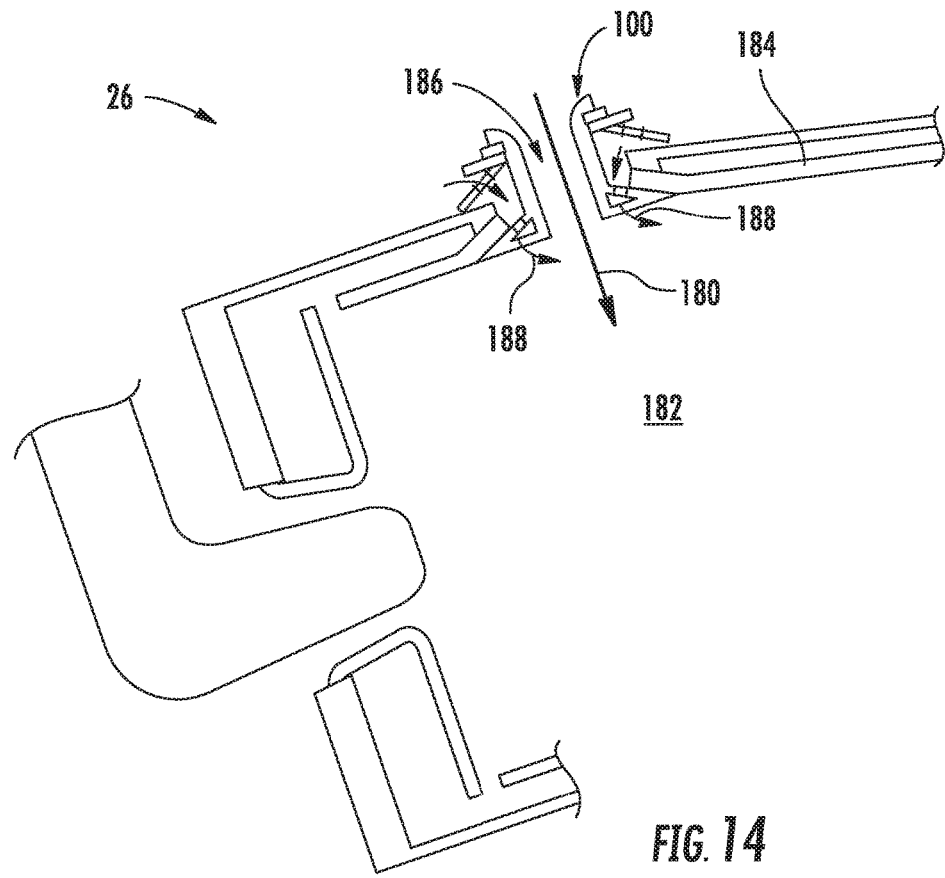
FIG. 14 provides a schematic representation of a combustion section of the exemplary gas turbine engine of FIG. 1 according to an exemplary embodiment of the present subject matter.

Referring now to FIGS. 13 and 14, one exemplary application of fastener 100 will be described. As illustrated, fastener 100 is positioned within a combustion section 26 of a gas turbine engine 10 to provide dilution air 180 into a combustion chamber 182 and provide film cooling to a combustor liner 184. In this regard, for example, fastener 100 is attached to combustor liner 184 and defines a central bypass passageway 186 for passing dilution air into combustion chamber 182 while also defining cooling holes 142 for film cooling combustor liner 184 (e.g., as indicated by film cooling arrows 188). Bypass passageway 186 thus extends through impingement baffle 160 and cooling face 122 and is in fluid communication with internal fluid passageway 130. It should be appreciated that the use of fastener 100 in combustion section 26 is only one exemplary application and is not intended to limit the scope of the present subject matter.

It should be appreciated that mechanical fastener 100 is described herein only for the purpose of explaining aspects of the present subject matter. For example, mechanical fastener 100 is used herein to describe exemplary configurations, constructions, and methods of manufacturing mechanical fastener 100. It should be appreciated that the additive manufacturing techniques discussed herein may be used to manufacture other fasteners for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of mechanical fastener 100 according to an exemplary embodiment of the present subject matter has been presented, an exemplary method 200 for forming a mechanical fastener according to an exemplary embodiment of the present subject matter is provided. Method 200 can be used by a manufacturer to form mechanical fastener 100, or any other suitable fastener. It should be appreciated that the exemplary method 200 is discussed herein only to describe exemplary aspects of the present subject matter, and is not intended to be limiting.

Figure 15:
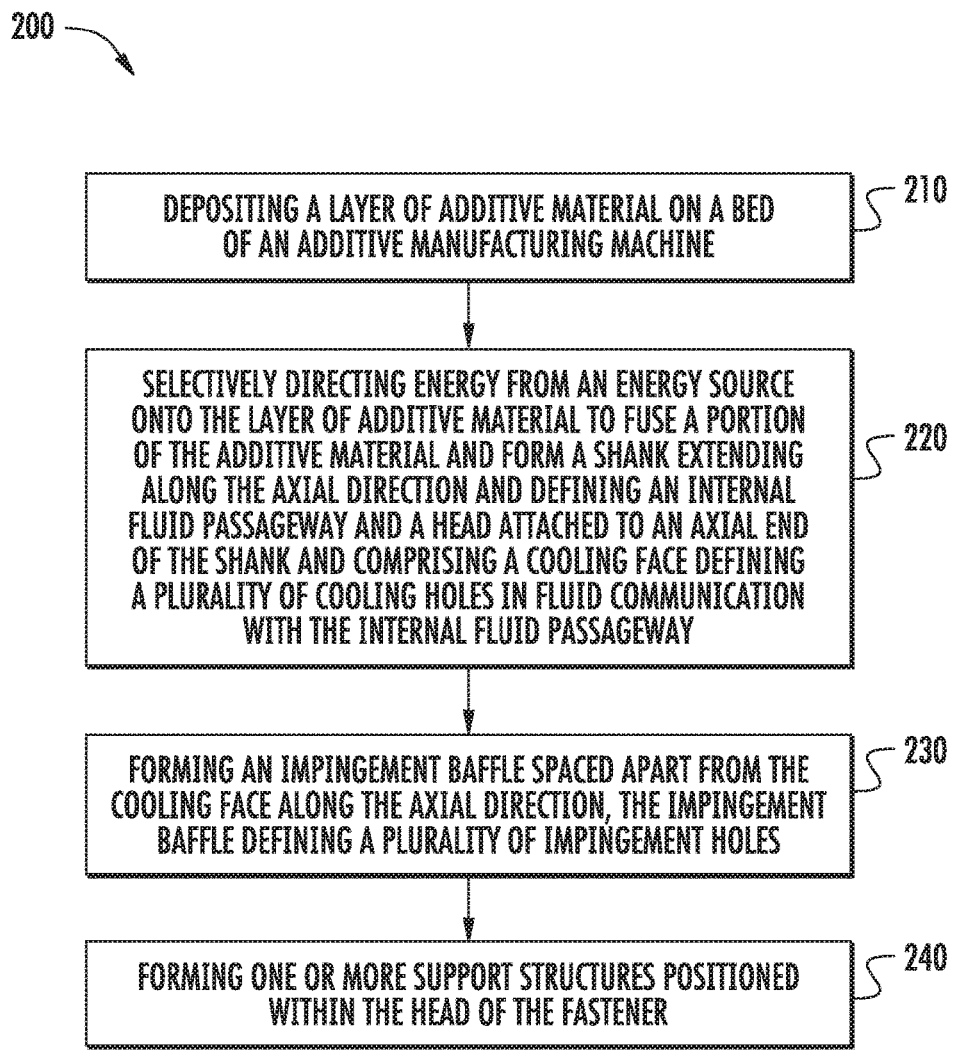
FIG. 15 is a method for forming a mechanical fastener according to an exemplary embodiment of the present subject matter.

Referring now to FIG. 15, method 200 includes, at step 210, depositing a layer of additive material on a bed of an additive manufacturing machine. Step 220 includes selectively directing energy from an energy source onto the layer of additive material to fuse a portion of the additive material and form a mechanical fastener. For example, according to one embodiment, the mechanical fastener may include a shank extending along the centerline and defining an internal fluid passageway. The mechanical fastener may further include a head attached to an axial end of the shank and a cooling face defining a plurality of cooling holes in fluid communication with the internal fluid passageway.

According to still other embodiments, step 230 may include selectively directing energy from the energy source to fuse a portion of the additive material to form an impingement baffle spaced apart from the cooling face along the centerline, the impingement baffle defining a plurality of impingement holes. In addition, step 240 may include forming one or more support structures such that they are positioned within the head of the fastener, e.g., to provide structural support to the cooling face, the head, or other regions of the mechanical fastener. It should be appreciated that the steps of depositing additive material and fusing that material, e.g., using any of the methods described above, may be used to form any other suitable features of the mechanical fastener.

FIG. 15 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using mechanical fastener 100 as an example, it should be appreciated that these methods may be applied to manufacture any suitable mechanical fastener.

An additively manufactured mechanical fastener and a method for manufacturing that fastener are described above. Notably, mechanical fastener 100 may generally include internal cooling fluid passageways and geometries that facilitate improved cooling and whose practical implementations are facilitated by an additive manufacturing process, as described herein. For example, using the additive manufacturing methods described herein, the mechanical fastener may include integral fluid passageways, a distribution plenum, impingement baffles, cooling holes, and unique head shapes that improve cooling efficiency. These features may be introduced during the design of the mechanical fastener, such that they may be easily integrated into the mechanical fastener during the build process at little or no additional cost. Moreover, the entire mechanical fastener, including the shank, the head, the impingement baffles, internal support structures, and other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufacturing fastener defining a centerline, the fastener comprising:
   a shank extending along the centerline and defining an internal fluid passageway; and a head attached to the shank and defining a distribution plenum in fluid communication with the internal fluid passageway, the head comprising a cooling face defining a plurality of cooling holes in fluid communication with the distribution plenum; and an impingement baffle positioned within the distribution plenum and spaced apart from the cooling face along the centerline, the impingement baffle defining a plurality of impingement holes.

2. The fastener of claim 1, wherein the shank defines a fluid inlet in fluid communication with the internal fluid passageway.

3. The fastener of claim 1, wherein the head of the fastener defines a mating face positioned opposite the cooling face along the centerline, the mating face defining one or more fluid inlets in fluid communication with the distribution plenum.

4. The fastener of claim 1, wherein the cooling holes extend through the cooling face substantially parallel to the centerline.

5. The fastener of claim 1, wherein the cooling holes extend through the cooling face at an angle relative to the centerline.

6. The fastener of claim 1, wherein the impingement holes extend through the impingement baffle substantially parallel to the centerline.

7. The fastener of claim 1, wherein the head defines a perimeter extending along an outermost portion of the head along a radial direction perpendicular to the centerline, and wherein the head defines at least one perimeter cooling passageway that extends through the impingement baffle at an angle relative to the centerline to direct a flow of cooling fluid onto the perimeter.

8. The fastener of claim 1, further comprising a bypass air passageway that extends through the impingement baffle and the cooling face, the bypass air passageway being in fluid communication with the internal passageway.

9. The fastener of claim 1, further comprising one or more support structures positioned within the distribution plenum.

10. The fastener of claim 1, wherein the shank is threaded or defines a groove for receiving a snap ring.

11. The fastener of claim 1, wherein the shank or the head define a means for fastening the fastener including at least one of a hole for receiving a cotter pin, an upset end for rivet, a swage fastener, or a keyed insert.

12. The fastener of claim 1, wherein the fastener is positioned within a combustion section of a gas turbine engine, the fastener passing through a combustor liner and defining a central bypass passageway in fluid communication with a combustion chamber for providing dilution air.

13. The fastener of claim 1, wherein a first portion of the fastener is formed from a first material and a second portion of the fastener is formed from a second material, the second material being different from the first material.

14. The fastener of claim 1, wherein the fastener comprises a plurality of layers defined along the centerline of the fastener, each of the plurality of layers being formed by:
depositing a layer of additive material on a bed of an additive manufacturing machine; and
selectively directing energy from an energy source onto the layer of additive material to fuse a portion of the additive material.

15. A method of manufacturing a fastener, the method comprising:
depositing a layer of additive material on a bed of an additive manufacturing machine; and
directing energy from an energy source onto the layer of additive material to fuse a portion of the additive material and form the fastener, the fastener comprising:
a shank extending along the centerline and defining an internal fluid passageway; and
a head attached to the shank and defining a distribution plenum in fluid communication with the internal fluid passageway, the head comprising a cooling face defining a plurality of cooling holes in fluid communication with the distribution plenum; and
an impingement baffle positioned within the distribution plenum and spaced apart from the cooling face along the centerline, the impingement baffle defining a plurality of impingement holes.

16. The method of claim 15, further comprising:
forming on the shank or the head a means for fastening the fastener including at least one of a hole for receiving a cotter pin, an upset end for rivet, a swage fastener, or a keyed insert.

17. The method of claim 15, further comprising:
forming an impingement baffle spaced apart from the cooling face along the centerline, the impingement baffle defining a plurality of impingement holes.

18. The method of claim 15, further comprising:
forming one or more support structures positioned within the head of the fastener.

19. The method of claim 15, wherein the shank and the head are integrally formed as a single monolithic component.

* * * * *